United States Patent
Zhang et al.

(10) Patent No.: US 7,722,991 B2
(45) Date of Patent: May 25, 2010

(54) HIGH PERFORMANCE ANODE MATERIAL FOR LITHIUM-ION BATTERY

(75) Inventors: Pu Zhang, Ann Arbor, MI (US); Junqing Ma, Ann Arbor, MI (US); Suresh Mani, Ann Arbor, MI (US); Monique Richard, Ann Arbor, MI (US); Shoji Yokoishi, Susono (JP); Brian Glomski, Ypsilanti, MI (US); Liya Wang, Ann Arbor, MI (US); Shih-Chieh Yin, Ann Arbor, MI (US); Kimber L. Stamm, Ann Arbor, MI (US); Chris Silkowski, Livonia, MI (US); John Miller, Eugene, OR (US); Wen Li, Ann Arbor, MI (US)

(73) Assignees: Toyota Motor Corporation, Toyota (JP); Toyota Motor Engineering & Manufacturing North America, Inc., Erlanger, KY (US); T/J Technologies, Inc., Ann Arbor, MI (US)

( * ) Notice: Subject to any disclaimer, the term of this patent is extended or adjusted under 35 U.S.C. 154(b) by 555 days.

(21) Appl. No.: 11/463,394

(22) Filed: Aug. 9, 2006

(65) Prior Publication Data
US 2008/0038638 A1    Feb. 14, 2008

(51) Int. Cl.
*H01M 4/58* (2006.01)
(52) U.S. Cl. ............... 429/231.95; 429/218.1
(58) Field of Classification Search ............ 429/231.95, 429/209, 214, 232, 217, 218.1, 213; 252/182.1
See application file for complete search history.

(56) References Cited
U.S. PATENT DOCUMENTS

| | | | |
|---|---|---|---|
| 3,925,098 A | 12/1975 | Saunders et al. | |
| 5,772,934 A | 6/1998 | MacFadden | |
| 6,203,944 B1 | 3/2001 | Turner et al. | |
| 6,395,423 B1 * | 5/2002 | Kawakami et al. | 429/215 |
| 6,524,744 B1 | 2/2003 | Clerc et al. | |
| 6,558,847 B1 | 5/2003 | Kawakami et al. | |
| 2003/0207177 A1 | 11/2003 | Matsubara et al. | |
| 2003/0215717 A1 | 11/2003 | Miyaki | |
| 2004/0062990 A1 | 4/2004 | Shimamura et al. | |
| 2004/0214085 A1 | 10/2004 | Sheem et al. | |

* cited by examiner

*Primary Examiner*—Patrick Ryan
*Assistant Examiner*—Monique Wills
(74) *Attorney, Agent, or Firm*—Gifford, Krass, Sprinkle, Anderson & Citkowski, P.C.

(57) ABSTRACT

An anode material with lithium-alloying particles contained within a porous support matrix is provided. The porous support matrix preferably has a porosity of between 5 and 80% afforded by porosity channels and expansion accommodation pores, and is electrically conductive. More preferably the support matrix has a porosity of between 10 and 50%. The support matrix is made from an organic polymer, an inorganic ceramic or a hybrid mixture of organic polymer and inorganic ceramic. The organic polymer support matrix and can be made from a rod-coil polymer, a hyperbranched polymer, UV cross-linked polymer, heat cross-linked polymer or combination thereof. An inorganic ceramic support matrix can be made from at least one group IV-VI transition metal compound, with the compound being a nitride, carbide, oxide or combination thereof. The lithium-alloying particles are preferably nanoparticles with a mean linear dimension of between 5 and 500 nanometers, and more preferably have a mean linear dimension of between 5 and 50 nanometers.

28 Claims, 2 Drawing Sheets

HIGH PERFORMANCE ANODE MATERIAL FOR LITHIUM-ION BATTERY

FIELD OF THE INVENTION

The present inventions relate to a lithium-ion battery, in particular to a high performance anode material for a lithium-ion battery.

BACKGROUND OF THE INVENTION

The energy requirements for batteries are continually increasing, while constraints on volume and mass continue to be present. Further, the demand for safe, low cost and environmentally friendly materials is increasing. These demands and battery specifications cannot be met using traditional lithium-ion battery chemistries. Although lithium-ion batteries have long been optimized and have demonstrated stable energies, these systems are limited by the amount of lithium that can be reversibly inserted and removed from the battery's active material structure.

The requirements for greater performance, safety, low cost and environmentally friendly materials can only be achieved through the development of new battery materials. Researchers have proposed the replacement of the carbon-based anode with tin. Tin alloys with lithium during the charging of the battery. The lithium-tin alloy forms a maximum concentration of 4.4 lithium atoms per tin atom, a concentration which equals a capacity of 993 mAh/g. A traditional carbon-based anode has a theoretical capacity of 372 mAh/g. Therefore, the replacement of traditional carbon-based anode batteries with tin-based anode batteries could result in higher energy capabilities.

Research has demonstrated that there are two main issues with the use of a tin-based anode. The first is a poor cycle life and the second is a poor utilization of the tin. A poor cycle life is defined as poor retention of battery energy as a function of the number of charge-discharge cycles. Researchers have taken two approaches to solving these problems. First, by forming an intermetallic compound of tin and at least one other metal, and second, by adding a non-electrochemically active material to the anode composite. However, the prior research has failed to address the fundamental causes of the poor performance of lithium-tin batteries, which are: 1) a large volume expansion of the tin-lithium particles resulting from the alloying of lithium with tin on charge; and 2) the breaking apart of tin agglomerates during the above-stated volume expansion. The volume expansion results in separation of the tin particles from the matrix during subsequent cycles and breaking of tin agglomerates results in fine particles with exposed fresh surface area. This fresh surface area is not in contact with the matrix, and thus like the separation of tin particles from the matrix, results in decrease in battery capacity. Therefore, there is a need for a lithium-tin battery that exhibits adequate cycle life and proper utilization of the tin.

SUMMARY OF THE INVENTION

An anode material with lithium-alloying particles contained within a porous support matrix is provided. The lithium-alloying particles are preferably nanoparticles. The porous support matrix preferably has a porosity of between 5 and 80% afforded by porosity channels and expansion accommodation pores that contain at least one lithium-alloying particle within. More preferably the support matrix has a porosity of between 10 and 50%.

The lithium-alloying particles preferably have a mean linear dimension of between 5 and 500 nanometers, and more preferably have a mean linear dimension of between 5 and 50 nanometers. The expansion accommodation pores preferably have a mean linear dimension of between 10 nanometers and 2.5 microns, and more preferably have a mean linear dimension of between 10 and 250 nanometers. In this manner, the expansion accommodation pores accommodate the expansion of lithium-alloying particles when said particles are alloyed with lithium and expand.

The porous support matrix is preferably electrically conductive and is made from an organic polymer, an inorganic ceramic or a hybrid mixture of organic polymer and inorganic ceramic. The organic polymer support matrix and can be made from a rod-coil polymer, a hyperbranched polymer or combination thereof. An inorganic ceramic support matrix can be made from a group IV-VI transition metal compound, with the compound being a nitride, carbide, oxide or combination thereof.

DETAILED DESCRIPTION OF THE INVENTION

Figure 1:
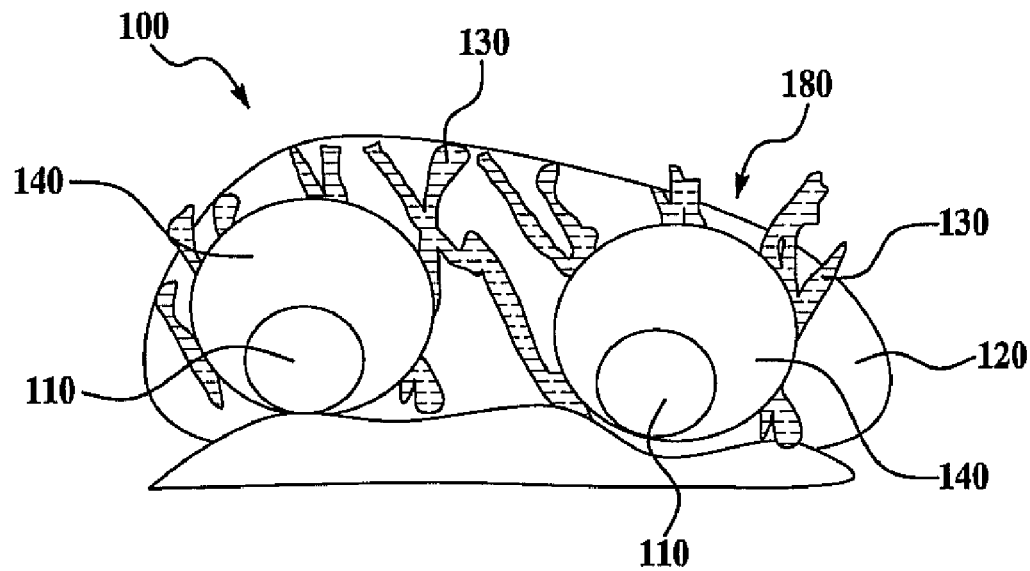
FIG. 1 shows a schematic representation of a high performance anode material for a lithium-ion battery in a discharged state.

In accordance with the present inventions, a high performance anode material 100 in a charged state consists of one or more lithium-alloying particles 110 contained within one or more expansion accommodation pores 140, said particles and pores surrounded by a support matrix 120 with porosity channels 130 contained therein (FIG. 1). Preferably the lithium-alloying particles 110 are nanosized particles, also known as nanoparticles by those skilled in the art. For the purposes of this inventions, nanosized particles or nanoparticles are microscopic particles with diameters measured in nanometers (nm) and with at least one measurement of the diameter less than or equal to 999 nanometers. The lithium-alloying particles 110 can be any metal or alloy that alloys with lithium, illustratively including tin, silicon, germanium, lead, antimony, aluminum, tin alloys and silicon alloys. For illustrative purposes only tin alloys include multicomponent (binary, ternary, etc.) alloy systems of tin and silicon alloys include multicomponent (binary, ternary, etc.) alloy systems of silicon.

At least one lithium-alloying particle 110 contained within an expansion accommodation pore 140, said particle and pore surrounded by the support matrix 120 with porosity channels 130 contained therein, is referred to as a composite particle 180. Although the lithium-alloying particles 110 shown in FIG. 1 are representative of spherical particles, in the alternative high performance anode material 100 can be comprised of lithium-alloying particles 110 of any non-spherical or polyhedron shape, illustratively including spheroids and polyhedrons. The expansion accommodation pores 140 also need not be spherical. In addition, the lithium-alloying particles 110 shown in FIG. 1 represent non-lithiated particles.

Non-lithiated particles, also known as unlithiated particles, are defined in the present inventions as lithium-alloying particles 110 that have not yet alloyed with lithium. Without being bound by theory, the present inventors believe that upon alloying with lithium, the lithium-alloying particles 110 expand two to five times their size when in the unlithiated state.

Volume expansion of spherical lithium-alloying particles 110 is proportional to the radius of the particle cubed. Thus nanosized primary lithium-alloying particles 110 minimize overall volume expansion. For the purposes of this inventions the term "primary particles" refers to individual nanosized lithium-alloying particles 110. Furthermore, secondary lithium-alloying particles (not shown) may be enclosed within the support matrix 120 and contained within expansion accommodation pores 140, wherein "secondary particles" refers to an agglomeration of primary particles 110. Thus, lithium-alloying particles 110 can include primary lithium-alloying particles 110 and/or secondary lithium-alloying particles.

The lithium-alloying particles 110 are nano-dispersed within the support matrix 120. The composite particle 180 preferably has lithium-alloying particles 110 with a mean linear dimension between 1 and 999 nm and expansion accommodation pores 140 with a mean linear dimension between 2 nm and 5 microns (µm). For the purposes of this inventions the term "mean linear dimension" refers to an average of three orthogonal axes, for example X, Y and Z axes, representing three dimensions of the particle or pore in each respective direction. More preferably a composite particle 180 has lithium-alloying particles 110 with a mean linear dimension between 5 and 500 nm and expansion accommodation pores 140 with a mean linear dimension between 10 nm and 2.5 µm. Even yet more preferred, the lithium-alloying particles 110 have a mean linear dimension of between 5 and 50 nm and expansion accommodation pores 140 with a mean linear dimension of between 10 and 250 nm. And even yet more preferred, the lithium-alloying particles 110 have a mean linear dimension of between 5 and 20 mm and the expansion accommodation pores 140 have a mean linear dimension of between 10 and 100 nm.

The mean linear dimension of the expansion accommodations pores 140 is preferably 2 to 5 times the mean linear dimension of the lithium-alloying particles 110. More preferably, the mean linear dimension of the expansion accommodations pores 140 is preferably 2 to 4 times the mean linear dimension of the lithium-alloying particles 110. Most preferably, The mean linear dimension of the expansion accommodations pores 140 is preferably 2 to 3 times the mean linear dimension of the lithium-alloying particles 110.

Figure 2:
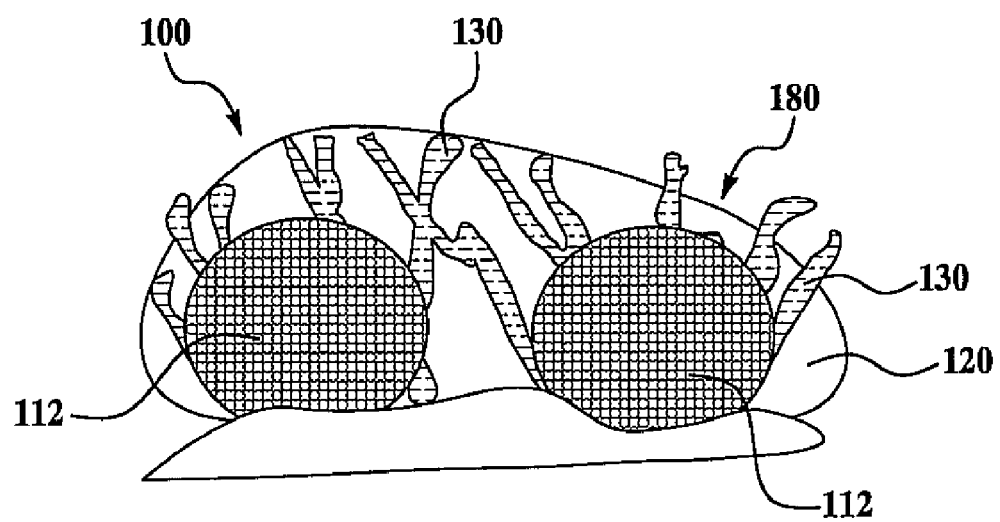
FIG. 2 shows a schematic representation of a high performance anode material for a lithium-ion battery in an charged state.

The porosity channels 130 within matrix 120 allow for the diffusion of lithium ions to pass therethrough. The expansion accommodation pores 140 accommodate volume expansion of the lithium-alloying particles 110 during charging when the lithium-alloying particles 110 alloy with lithium to form lithium-alloyed particles 112, also known as lithiated particles (FIG. 2). Furthermore, the support matrix 120, with porosity channels 130 contained therein, has some degree of electronic conductivity and can accommodate a relatively small amount of the volume expansion of lithium-alloying particles 110 during charging.

Upon discharging of a battery using the composite particles 180 of the present inventions, lithium de-alloys from the lithiated particles 112 (FIG. 2), thereby resulting in said particles 180 with lithium-alloying particles 110 contained therein (FIG. 1). Although the present inventions described thus far illustrates a composite particle 180 initially manufactured with lithium-alloying particles 110 contained within expansion accommodation pores 140 (FIG. 1), the composite particle 180 can be initially manufactured with lithiated particles 112 contained within said pores 140 (FIG. 2). Furthermore, the unlithiated lithium-alloying particles 110 and/or the lithiated lithium-alloying particles 112 can be bound within the support matrix 120 by encapsulation, entanglement, chemical bonding and any combination thereof.

In accordance with a first embodiment of the present inventions, the support matrix 120 is ceramic, for example vanadium carbide. The support matrix 120 made from ceramic is highly porous, preferably with a void space of between 5 and 80% afforded by porosity channels 130 and expansion accommodation pores 140 contained therein. More preferably the void space is between 10 and 50%. The rigidity and electronic conductivity of the matrix 120 made from ceramic are adjusted by altering the process parameters and/or the chemical composition of the matrix. In addition, the electronic conductivity, ionic conductivity, electrochemical stability and thermal stability are adjusted by altering the process parameters and/or the chemical composition of the matrix. The support matrix 120 made from ceramic is comprised from at least one group IV-VI transition metal compound. The compound is selected from the group consisting of nitrides, carbides, oxides and combinations thereof.

In a second embodiment of the present inventions, the support matrix 120 of the composite particle 180 is polymeric. The polymer framework is preferably highly porous, has a void space of greater than 50% afforded by porosity channels 130 and expansion accommodation pores 140 contained therein, and has no detrimental chemical or electrical reactions with particles 110 and/or particles 112. Similar to the matrix 120 made from ceramic, the pores 140 of the matrix 120 made from polymer accommodate the expansion and contraction of the lithium-alloying particles when alloyed and de-alloyed with lithium, respectively. In addition, the porosity channels 130 allow lithium ions within an electrolyte to freely penetrate and in combination with matrix 120 can accommodate a relatively small amount of expansion of the lithium-alloying particles 110 alloying with lithium.

The matrix 120 can include conductivity or performance enhancers, non-electroactive expansion buffer elements, electroactive expansion buffering elements, binding elements, adhesion promoters and any combination thereof. For example, if the matrix 120 made from a polymer is not electronically conductive, electroactive elements can be added, illustratively including carbon-base materials, metals, alloys, metal nitrides, metal carbides alloy nitrides, alloy carbides and combinations thereof. And if the matrix 120 made of polymer is not ionic conductive, additions of lithium-ion conductive polymers can be added. Non-electroactive and/or electroactive expansion buffer elements can be added to enhance the capability of matrix 120 to buffer or accommodate the expansion and contraction of the lithium-alloying particles 110 when alloyed and de-alloyed with lithium, respectively. The matrix 120 made of polymer can contain binding elements and adhesion promoters, illustratively including polyvinylidene difluoride, vinylidene difluoride: hexafluoropropylene copolymer; EPDM; and SBR:CMC. The matrix 120 made of polymer can also take the form of rod/coil polymers, hyperbranched polymers, UV cross-linked polymers, heat cross-linked polymers and combinations thereof.

As an alternative to the incorporation of nanosized lithium-alloying particles 110 within the matrix 120 upon initial processing, lithium-alloying halides illustratively including $SnCl_2$, can be incorporated within the matrix 120 and subsequently reduced to elemental particles at relatively low temperatures, for example room temperature. The production of lithium-alloying particles 110 using this method can afford lithium-alloying particles 110 with a mean linear dimension between 5 and 100 nanometers. In addition, the lithium-alloying particles can be incorporated within the matrix 120 by any physical, chemical or physiochemical method using a single or multi-step procedure. The physical method can be comprised of ball milling or other physically mixing technologies. The chemical method can be comprised of chemical reactions under a controlled temperature program, controlled atmospheres and combinations thereof. The physiochemical method can be comprised of chemical vapor deposition (CVD) processes. In the alternative a combination of the chemical, physical and physiochemical methods may be used. In addition, the matrix 120 may be formed independently of particles 110 or particles 112, or synthesized in situ with particles 110 or particles 112.

To afford an electrode from the high performance anode material 100, a plurality of composite particles 180 are bound together within an electrode matrix using methods and processes known to those skilled in the art. For illustrative purposes only, the composite particles 180 can be encapsulated within the electrode matrix, entangled within the electrode matrix, chemically bonded with the electrode matrix and any combination thereof. In this manner the high performance anode material 100 of the present inventions affords an improved rechargeable lithium battery. Although not shown in the figures nor described in the present inventions, the battery using the above-described high performance anode material may or may not use an electrolyte such as salts and/or solvents.

For illustrative purposes only, two examples regarding the formation and performance of the present invention are provided.

Example 1

Figure 3:
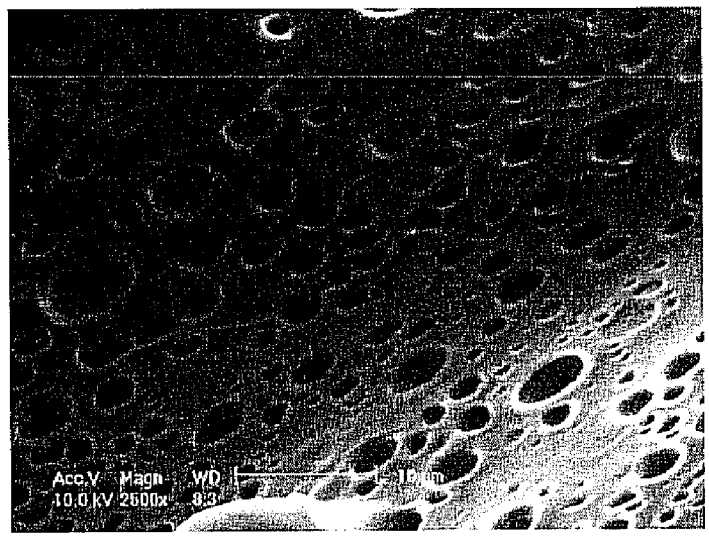
FIG. 3 shows an SEM image of a porous polymer demonstrating that the pores are located inside and outside of the polymer.

A typical synthetic procedure for UV polymers includes 1 g of PC1000, 0.5 g of PC2003, 0.2 g Decahydronaphthalene (porogen), 2 g nitro-methane (solvent), and 0.02 g photo-initiator loaded into a tall-form quartz beaker and mechanically stirred vigorously for 30 minutes in the absence of light. The mixture is then sonicated using a VCX 750 Vibra-cell ultrasonicator for 20 minutes. With continued stirring, the mixture is placed 10 cm from a UV lamp in a UV box with UV irradiation continued for 1-10 minutes. The solid content is then filtered out and washed using de-ionized water. Finally, the UV polymer is dried in an oven at 80° C. under vacuum for 24 hours. The resulting structure, demonstrating pores inside and outside the UV polymer, is shown in FIG. 3.

Example 2

Figure 4:
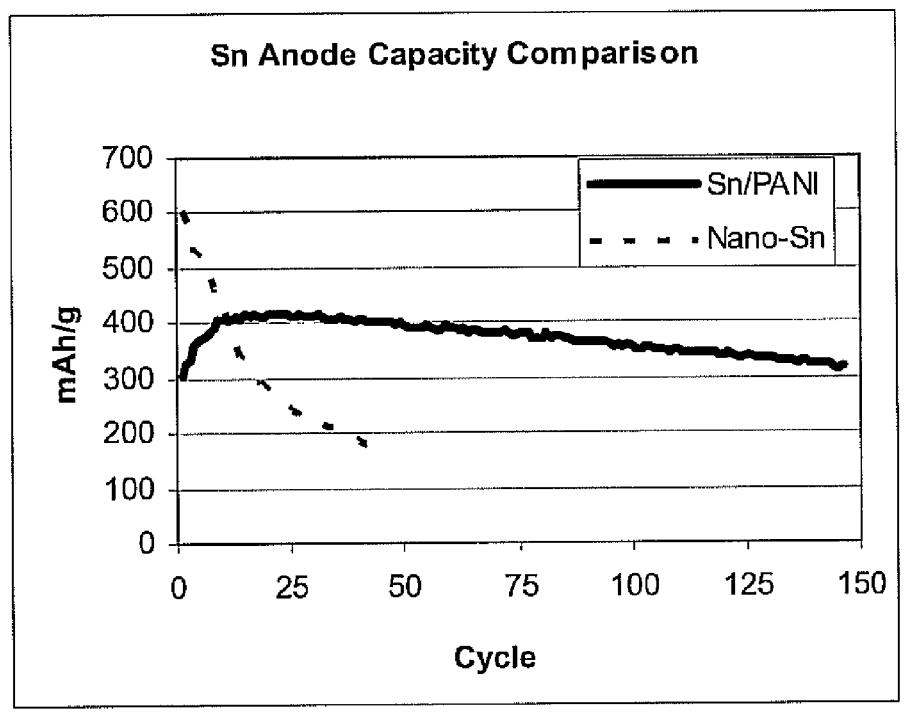
FIG. 4 shows a Sn anode capacity comparison indicating Sn/PANI structural advantage over others.

A comparison of nanoparticles of Sn versus an unoptimized configuration of the Sn/polymer matrix material is shown in FIG. 4. As shown in this figure, the unoptimized configuration of the Sn/polymer matrix material shows good cycle stability. The Sn/PANI composite composition tested is 1:1 (wt) and the electrode composition is: Sn/PANI:carbon (electron conductive additive):SBR/CMC(6:4) (binder)=8:1:1 (wt)+Optimization of the Sn/polymer matrix material could include: 1) refining the polymer:Sn ratio to improve capacity, while retaining good cycle life; and 2) optimizing synthesis conditions for the purpose of obtaining uniform pore size, etc.

The inventions are not restricted to the illustrative examples described above. The examples are not intended as a limitation on the scope of inventions. Methods, apparatus, compositions and the like described herein are exemplary and not intended as a limitation on the scope of the inventions. Changes therein and other uses will occur to those skilled in the art. The scope of the inventions are defined by the scope of the claims.

The invention claimed is:

1. A battery comprising:
    a cathode;
    a separator;
    an anode having a composite particle, said composite particle having a matrix defining a void volume, said void volume comprised of a plurality of porosity channels and an expansion accommodation pore; and
    a lithium-alloying particle, said lithium-alloying particle contained within said expansion accommodation pore of said anode.

2. The invention of claim 1 wherein said lithium-alloying particle is an unlithiated particle.

3. The invention of claim 1 wherein said lithium-alloying particle is a lithiated particle.

4. The invention of claim 1 wherein said matrix contains a conductivity enhancer.

5. The invention of claim 4 wherein said conductivity enhancer is an electroactive material.

6. The invention of claim 4 wherein said conductivity enhancer is an ionic conductive material.

7. The invention of claim 1 wherein said matrix contains a binding element.

8. The invention of claim 1 wherein said matrix contains an adhesion promoter.

9. The invention of claim 1 wherein said matrix is an organic polymer.

10. The invention of claim 9 wherein said polymer is selected from the group consisting of: a rod-coil polymer, a hyperbranched polymer, UV cross-linked polymer, heat cross-linked polymer, and a combination thereof.

11. The invention of claim 1 wherein said matrix is an inorganic ceramic.

12. The invention of claim 11 wherein said ceramic is a group IV-VI transition metal compound, said compound being selected from the group consisting of: nitrides, carbides, oxides, and combinations thereof.

13. The invention of claim 1 wherein said matrix is a hybrid matrix, said hybrid matrix being a mixture of an organic polymer and an inorganic ceramic.

14. The invention of claim 1 wherein said lithium-alloying particle has a composition selected from the group consisting of: tin, silicon, germanium, lead, antimony, aluminum, tin alloys and silicon alloys.

15. The invention of claim 1 wherein said lithium-alloying particle is a nanoparticle having a mean linear dimension of between 1 and 999 nanometers.

16. The invention of claim 1 wherein said lithium-alloying particle is a nanoparticle having a mean linear dimension of between 5 and 500 nanometers.

17. The invention of claim 1 wherein said lithium-alloying particle is a nanoparticle having a mean linear dimension of between 5 and 50 nanometers.

18. The invention of claim 1 wherein said lithium-alloying particle is a nanoparticle having a mean linear dimension of between 5 and 20 nanometers.

19. The invention of claim 15 wherein said expansion accommodation pore has a mean linear dimension of between 2 nanometers and 5 microns.

20. The invention of claim 16 wherein said expansion accommodation pore has a mean linear dimension of between 10 nanometers and 2.5 microns.

21. The invention of claim 17 wherein said expansion accommodation pore has a mean linear dimension of between 10 and 250 nanometers.

22. The invention of claim 18 wherein said expansion accommodation pore has a mean linear dimension of between 10 and 100 nanometers.

23. The invention of claim 1 further comprising a plurality of said composite particles bound together within an electrode matrix.

24. The invention of claim 23 wherein said plurality of composite particles are bound together within said electrode matrix using a method selected from the group consisting of: encapsulation, entanglement, chemical bonding and combinations thereof.

25. The invention of claim 1 wherein said lithium-alloying particle is bound within said expansion accommodation pore using a method selected from the group consisting of: encapsulation, entanglement, chemical bonding and combinations thereof.

26. The invention of claim 2 wherein the mean linear dimension of said expansion accommodation pore is 2 to 5 times the mean linear dimension of said unlithiated lithium-alloying particle.

27. The invention of claim 2 wherein the mean linear dimension of said expansion accommodation pore is 2 to 4 times the mean linear dimension of said unlithiated lithium-alloying particle.

28. The invention of claim 2 wherein the mean linear dimension of said expansion accommodation pore is 2 to 3 times the mean linear dimension of said unlithiated lithium-alloying particle.

* * * * *